United States Patent
Lange et al.

[19]

[11] Patent Number: 6,161,626
[45] Date of Patent: Dec. 19, 2000

[54] SAND TRAP CONDITIONER

[75] Inventors: Richard M. Lange, Racine; Stephen R. Voss, Sturtevant; Kellen J. Chicoine, Racine, all of Wis.

[73] Assignee: Textron Inc., Providence, R.I.

[21] Appl. No.: 09/526,912

[22] Filed: Mar. 16, 2000

Related U.S. Application Data

[62] Division of application No. 09/116,317, Jul. 15, 1998, Pat. No. 6,085,847.

[51] Int. Cl.⁷ .............................. A01B 13/00; A01B 49/02
[52] U.S. Cl. .......................... 172/197; 172/198; 172/200
[58] Field of Search .................................. 172/197, 198, 172/199, 200, 195

[56] References Cited

U.S. PATENT DOCUMENTS

| | | |
|---|---|---|
| 214,667 | 4/1879 | Keller ...................................... 172/200 |
| 640,514 | 1/1900 | Ernst . |
| 1,233,008 | 7/1917 | York . |
| 1,297,430 | 3/1919 | Winslow .............................. 172/197 X |
| 2,657,619 | 11/1953 | Gilbreath . |
| 2,719,393 | 10/1955 | Bowersox . |
| 2,871,959 | 2/1959 | Koskenmaki ....................... 172/200 X |
| 2,920,405 | 1/1960 | Cole . |
| 3,613,802 | 10/1971 | Carlson . |
| 3,771,608 | 11/1973 | Ancherico . |
| 3,823,781 | 7/1974 | Check et al. . |
| 5,265,681 | 11/1993 | Kincses . |
| 5,289,879 | 3/1994 | Fax et al. . |
| 5,915,631 | 6/1999 | Laxton et al. ............................. 24/302 |

*Primary Examiner*—Christopher J. Novosad
*Attorney, Agent, or Firm*—Arthur J. Hansmann

[57] ABSTRACT

A sand trap rake arranged particularly for use on a golf course and with fingers which penetrate the sand for plowing the sand. There is an adjustment relative to the plowing fingers which permits the fingers to be angulated so that they can be dragged through the sand with the tips of the fingers being in trailing position. The entire machine includes the plowing fingers arranged on one planar piece and being disposed in a plurality thereof in end-to-end relationship to each other and with dresser plates trailing the plowing fingers for smoothing the top of the sand.

7 Claims, 3 Drawing Sheets

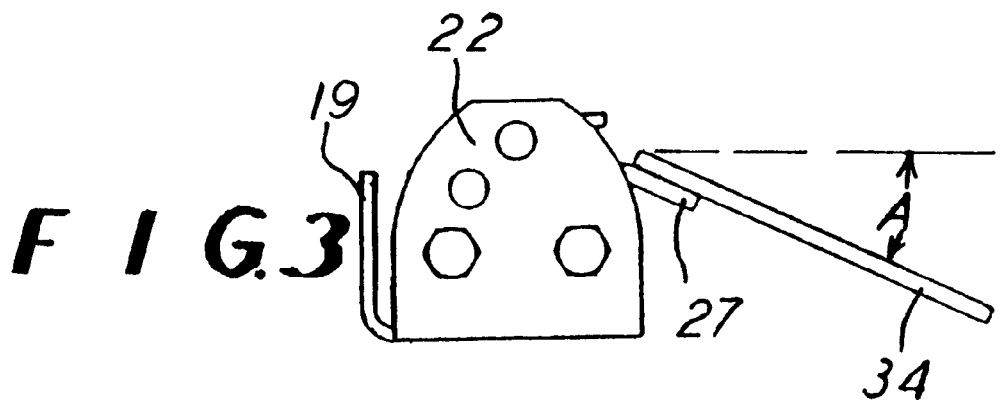
F I G. 3
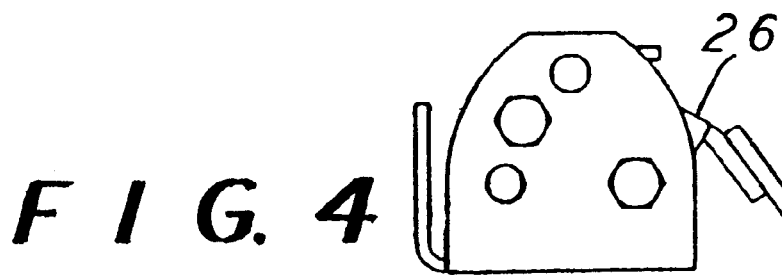
F I G. 4
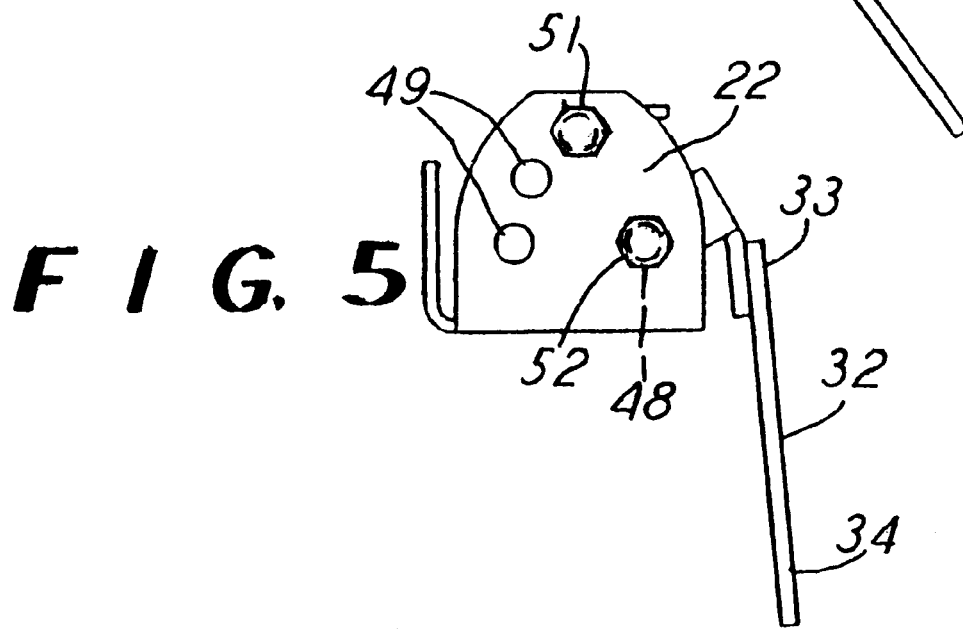
F I G. 5
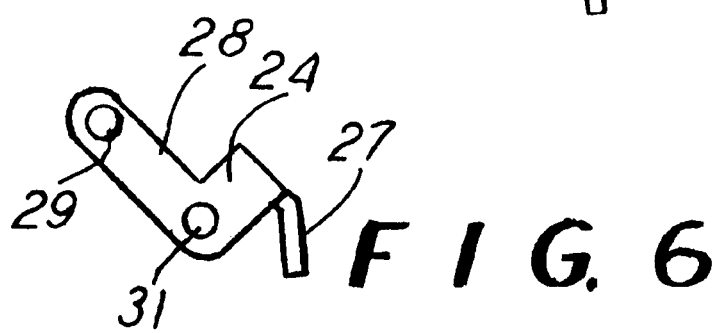
F I G. 6

SAND TRAP CONDITIONER

This is a Division of U.S. application Ser. No. 09/116,317, filed Jul. 15, 1998, and now U.S. Pat. No. 6,085,847.

This invention relates to a sand trap conditioner, and, more particularly, it relates to a sand rake particularly suitable for use on golf course sand traps.

BACKGROUND OF THE INVENTION

The prior art is already aware of sand trap rakes which are powered by a tractor or the like and which have fingers for plowing through the sand and to be followed by dresser or like implements for smoothing the sand. These rakes are commonly used when the surface of the sand has been upset, or when the sand has become hardened by weather conditions including rain, snow, freezing, and the like.

The present invention provides a sand trap rake which plows or conditions the sand to loosen and smooth the sand, all in one pass of the implement. In doing so, the tines which plow through the sand are disposed at a reclining angle so that any debris or the like which would otherwise tend to be caught by the tines will be removed from the tines when the tines are dragged at the inclined angle. In this arrangement, the tines are placed at the angle to the ground surface where any debris will be brushed off the tines. Further, the tines are presented on a single plate which has a backing and a plurality of tine fingers, all of which can be suitably attached to a support which is adjustable for purposes of altering the angle of inclination.

Still further, it is important in most environments, particularly with a golf course environment, to avoid creation of distraction noises, and the present invention does so by means of avoiding disturbing noises created by the articular parts of this machine being in contact with each other. In accomplishing this objective, there is an avoidance of chains which otherwise would be connecting parts, and there is utilization of dampening bumpers intervening between moving parts.

Still further, the present invention provides for the dragging of sand conditioning members which are restrictively free to move up and down but, by means of this invention, the upward movement is restricted so that the members remain in an operative position and do not flip upwardly out of that position.

Thus, the conditioner members of this invention are in modular sections in end-to-end relationship across the swath of the machine, and the tines themselves are adjustable for selecting the angle at which they produce the plowing action through the sand, as mentioned above, The adjustment is such that a plurality of angles can be selected, and, in each position, the angulated tines are held iii a fixed position until moved to the next adjustment, as desired. With that feature, the tines can be positioned for optimal treatment of the sand, according to the condition of the sand, such as compacted, loose, wet, frozen, with debris, or the like. Further, with the angulated adjustment arrangement, the depth of penetration into the sand can be selected and controlled.

The adjustable rake sections of this invention have three adjustable positions, although there could be any number of positions such as achieved by means of a slotted adjustment which would present infinite variety of positions. This allows the golf course maintenance personnel to operate with only the one attachment which is adjustable to the different angles based on the amount of aggressiveness required. Different times of the year may require more or less grooming, such as the early spring, after winter snow, and rain may require the sand to be loosened more, and then during normal summer operations, a less aggressive grooming is required. The system allows for an easy and quick adjustable method to change the aggressiveness of the rake. The adjustable rake sections are tipped at an angle for the operation in all settings, This allows for most of the debris that typically builds up on other's vertical fingers to easily slide away from the fingers and not plug the rake. Typically during the fall when leaves are present, and also when the traps have grass starting to grow into them, debris becomes a problem, and the rake of this invention negotiates those conditions.

The adjustable rake sections of this invention have the tines thereon which are a substitute for the commonly used vertically positioned bolted studs in other rakes. Those studs typically wear after use, and it is time consuming to unbolt and replace them after their useful life. With the rake of this invention, the complete section of tines is replaced as one section or unit, and only a few fasteners are required and thus there is a savings of time in the replacement.

BRIEF DESCRIPTION OF THE DRAWINGS

FIGS. 3, 4, and 5 are enlarged side elevational views of a portion of FIG. 2 and showing the parts in adjusted positions among the three views.

FIG. 6 is a side elevational view of the adjustable parts shown in FIGS. 2, 3, 4, and 5.

DETAILED DESCRIPTION OF THE PREFERRED EMBODIMENT

Figure 1:
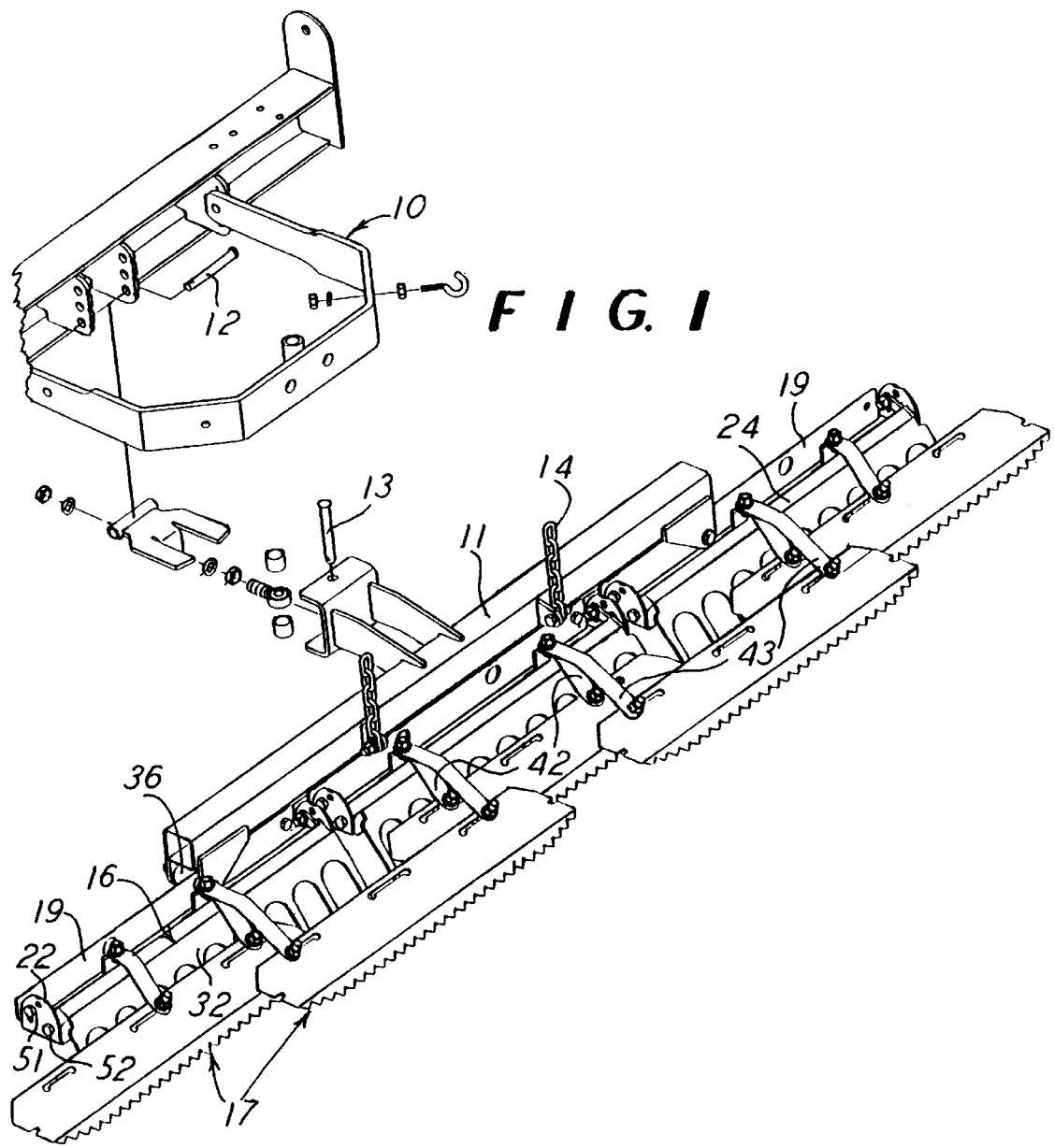
FIG. 1 is a top rear perspective view of a preferred embodiment of this invention, in exploded relationship with a supporting tractor.

A rear portion 10 of a conventional type of tractor is shown in exploded view to give transport and support for a horizontally disposed beam or connection bar 11. Pivot pins 12 and 13 respectively present a vertical and horizontal pivot of the beam 11 relative to the tractor 10. Also, chains 14 connect between the tractor 10 and the beam 11 for upward support of the beam, such as in the transport position for the rake being shown and described.

Figure 2:
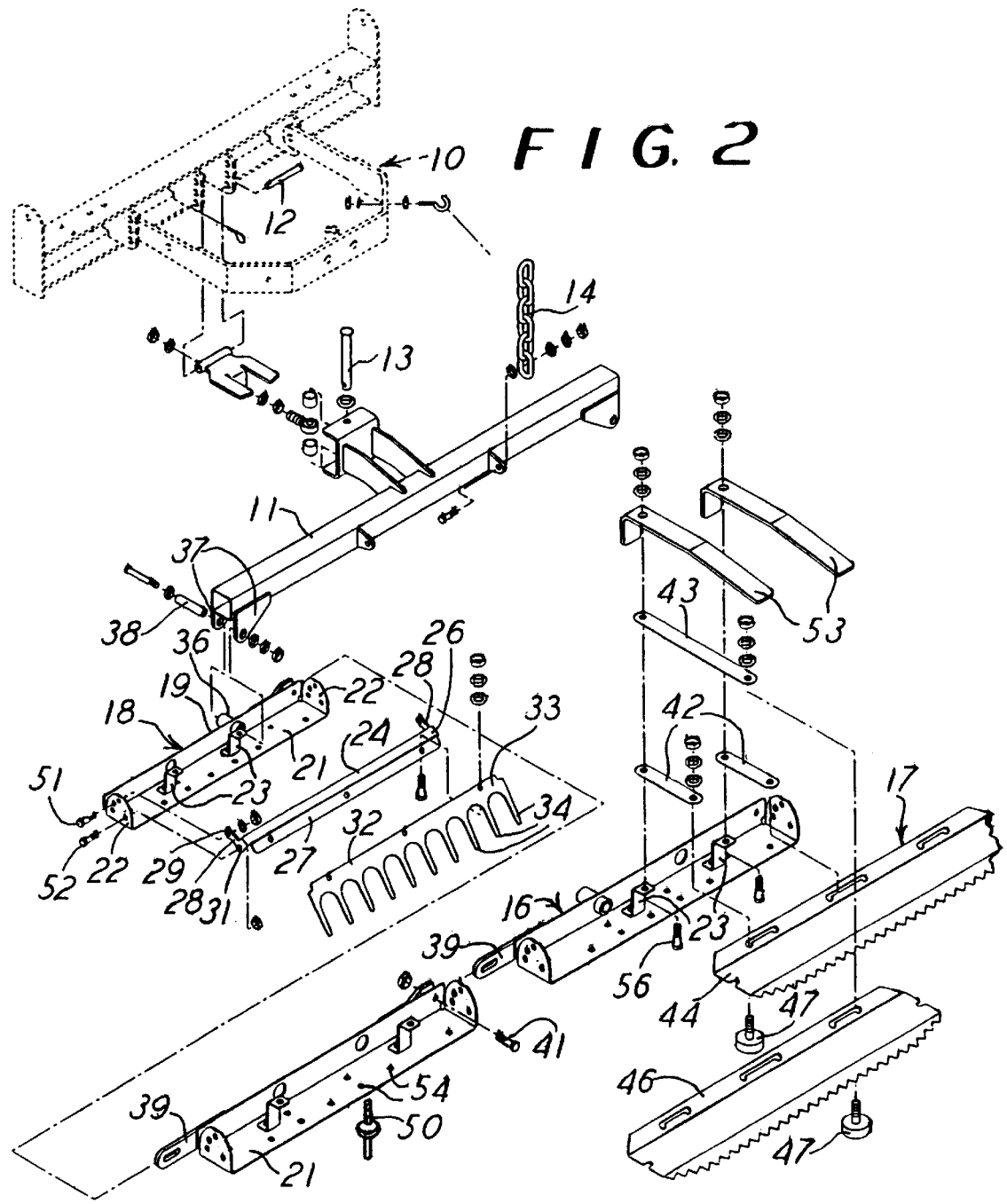
FIG. 2 is a perspective and exploded view of a portion of FIG. 1.

The assembly will of course move to the left, as viewed in FIGS. 1 and 2, and thus there are sand-penetrating assemblies designated 16 and sand-dresser assemblies designated 17, all trailing the beam 11 and being supported therefrom.

The assemblies 16 and 17 are modular and exist in three shown end-to-end assemblies 16 and five shown staggered dressers 17. Of course they are all arranged to provide one wide swath through and over the sand of a sand trap golf course, for instance.

The assemblies 16 include a base or box support member 18 which is elongated and arranged in a right angulated arrangement of an upstanding portion 19 and a horizontal portion 21 integral with each other. Also, upstanding end pieces 22 are at each end of the member 18. Further, there are two upstanding posts or brackets 23 affixed to the member 18.

The assemblies 16 also include an angulated bar member 24 which has an upward and horizontally disposed portion 26 and a rearward and inclined plate portion 27. Also, the member 24 has end tangs or extensions 28 each with suitable bolt holes 29 and 31 extending therethrough.

The member 24 is positioned to nest within the member 18, and the tangs 28 extend adjacent the upstanding end pieces 22 of the member 18.

A third part for the assembly 16 is the tine plate 32 which includes the base or back portion 33 and the plurality of fingers 34. As seen in FIGS. 3, 4, and 5, the plate 32 is of a planar configuration in that it extends along one plane, and the plurality of fingers 34 extend therealong and of course are spaced apart, all as clearly shown in FIG. 2, FIG. 2 also shows, by the exploded lines, the bolted connections for the tine plate 32 to be bolted to the bar 24, and, in turn, the bar 24, through its tangs 28, to be adjustably bolted to the member 18. As such, the three members 18, 24, and 32 are all suitably bolted together in one unit with the member 32 being in a fixed position relative to the member 24 and extending along the planar portion 27. The connecting lines and bolts and nuts are as shown in the drawings to accomplish the assembly described.

The assemblies 16 are articularly attached to the beam 11, such as by the sleeve 36 on the member 18 which is received within the plates 37 on the beam 11. Again, suitable bolts and nuts are utilized for making that articular attachment so that the assemblies 16 can rock laterally relative to the mounting sleeve 38 which connects between the plates 37 and the aforementioned sleeve 36.

FIG. 2 further shows that the center assembly 16 is supported by the two flanking and end assemblies 16, such as by connecting thereto by means of the slotted plates 39 extending off each single assembly 16 for making a bolted connection with the next assembly 16, such as through the shown bolt 41.

In that arrangement, the three assemblies 16 are in end-to-end relationship and are articularly mounted relative to the beam 11 to pivot laterally or parallel to the longitudinal plane of the beam 11 and thereby accommodate variations in the grade or level of the sand being worked upon.

Also, as mentioned, each assembly 16 includes the upstanding brackets 23 which have holes in the upper ends thereof for receiving two short straps 42 and two of a long strap 43. The straps 42 and 43 are thus suitably connected to the assemblies 16 and extend rearwardly therefrom and in turn suitably connect to the respective dresser members 44 and 46, In that arrangement, there is no metal member connecting the dressers 44 and 46 into the overall machine, and thus there is no creation of undue noise because the straps 42 and 43 are of a plastic, leather, or like durable material which does not create a sound when engaged by or with another member, but flexes.

Still further, there is a rubber or plastic type bumper 47 connected to one of the members 44 or 46 to extend therebetween and thus avoid noise production if the two members 44 and 46 were to come together. Also, the bumpers 47 are shown to contain the bolt threads for connecting the dressers 44 and 46 with the respective straps 42 and 43 and to the nuts shown adjacent thereto.

FIGS. 3, 4, 5, and 6 show the adjustable connection for the rake 32, and it is seen that the member 24 has its tangs or arms 28 integral therewith, along with the planar piece 27 which extends for virtually the length of the member 24 as seen in FIG. 2. The rake 32 then has its planar portion 33 in contact with the wall 27, and the rake is suitably secured thereto by bolts, such as those shown in FIG. 2.

The member 24 has its two spaced-apart holes 29 and 31 in its upright or tang portion 28, as seen in FIGS. 2 and 6. The hole 31 aligns with a like hole 48 in each of the two upstanding side pieces 22, and the hole 29 selectively aligns with one of the three holes 49 on the side piece 22. With that arrangement, the member 24, along with its affixed rake 32, can be angulated among the three positions shown in FIGS. 3, 4 and 5. Therefore, the angulation of the rake 32 with its lower end rightward as seen in FIGS. 3, 4, and 5, creates the negative or drag angle of the rake 32 relative to the forward movement of the machine over the ground, that is, leftward in FIGS. 3, 4, and 5. Also, in FIG. 3, the rake fingers 34 are at their shallowest sand penetration, and in FIG. 5, the fingers 34 are at their maximum penetration. However, the fingers 34 are never positioned directly vertically, and they are therefore also in the defined negative angle for dragging the fingers 34 through the sand in the plowing action. Of course there are two bolts 51 and 52 which respectively extend through the aligned holes 29 and 49 and also aligned holes 31 and 48, for securing the member 24 with the rake 32 to the box member 18.

The arrangement is such that, if desired, the vertically disposed studs 50 can be secured to the planar portion 21 of the box member 18, if and when desired. It would be understood that there would be a plurality of the studs 50 extending through the openings 54 in the planar portion 21, and that arrangement could be supplement the plowing of the sand in addition to the use of the rake 32, or even alternative thereto, That is, the arrangement with the member 24 accommodates the inclusion of the fingers 34 and the studs 50 in the entire machine.

FIG. 2, but not FIG. 1, shows two angulated bars 53 which are mounted on the respective upright 23, such as by means of the standard bolts and nuts shown. The bears 53 extend rearwardly and over the dresser plates 44 to engage the plates 44 in the event they tend to rise up and possibly flip over beyond the desired operating position of being dragged over the top of the sand. It will be understood that there can be one or two of the bars 53 for every one of the plates 44. Also, as shown, a single screw, such as the screw 56 can be utilized for holding one end of the two straps 42 and 43 as well as one end of the bar 53 on the assembly 16.

FIGS. 3, 4, and 5, show the angulation of the time plate 32, and FIG. 3 shows the shallow angle A relative to the horizontal ground line, and FIGS. 4 and 5 show a greater angulation relative to the ground. Angle A is the angle of inclination of the plate 32 relative to the horizontal ground line.

What is claimed is:

1. A sand trap rake assembly comprising
a beam disposed horizontally and spaced above the ground for movement over the ground in a direction of operation,
a plurality of tine plates operatively connected with said beam and being in end-to-end relationship therealong and having tines depending therefrom for engaging sand on the ground and being inclined rearwardly from said beam and relative to the direction of operation,
the connection of said plates relative to said beam being arranged to be adjustable for selectively adjustably inclining said tines relative to the direction of operation,
a plurality of ground combing plates connected with said beam and being disposed rearwardly of said tine plates for engaging the sand after said tines engage the sand during operation,
flexible straps interconnected relative to said beam and said combing plates for connecting said combing plates in the assembly and being arranged to drag said combing plates over the sand during operation, and anti-flip bars interengaged between said beam and said combing plates and arranged to obstruct any tendency of said combing plates flipping over to an upside-down position.

2. A sand trap rake assembly comprising a beam disposed horizontally and spaced above the ground for movement over the ground in a forward direction of operation and having a longitudinal axis extending transverse to said direction, a plurality of tines operatively connected with said beam and being spaced apart in a direction parallel to said beam axis and depending therebelow for engaging sand on the ground, a plurality of ground combing plates disposed in a position rearwardly of said tines relative to said direction of operation and having a downwardly facing surface for engaging the sand after said tines engage the said during operation, flexible straps composed of non-metalic material interconnected relative to said beam and said combing plates for connecting said combing plates in the rearward position relative to said tines and being arranged to drag said combing plates over the sand during forward operation and with said downwardly facing surface engaged with the sand, and anti-flip bars interengaged between said beam and said combing plates and arranged to obstruct any tendency of said combing plates flipping over to a position of said downwardly facing surface facing upwardly.

3. A sand trap rake assembly comprising a beam disposed horizontally and spaced above the ground for movement over the ground in a forward direction of operation and having a longitudinal axis extending transverse to said direction, a plurality of tines operatively connected with said beam and being spaced apart in a direction parallel to said beam axis and depending therebelow for engaging sand on the ground, a plurality of ground combing plates disposed in a position rearwardly of said tines relative to said direction of operation and having a downwardly facing surface for engaging the sand after said tines engage the said during operation, flexible straps composed of non-metalic material interconnected relative to said beam and said combing plates for connecting said combing plates in the rearward position relative to said tines and being arranged to drag said combing plates over the sand during forward operation and with said downwardly facing surface engaged with the sand, said combing plates are arranged in two rows of offset plates which are disposed in shingled relationship in the rows to thereby have overlapping portions in the vertical direction, and bumpers disposed between said combing plates in their overlapping portions to thereby prevent contact between said combing plates upon vertical movement of said combing plates relative to each other.

4. The sand trap rake assembly as claimed in claim 3, wherein said straps and said bumpers are respectively directly connected to each other and to respective ones of said plates.

5. The said trap rake assembly as claimed in claim 3 including anti-flip bars of rigid material interengaged between said beam and said combing plates and spaced above and extending over said plates and being arranged to obstruct any tendency of said combing plates flipping over to a position away from said downwardly facing surface engaged with the sand.

6. A sand trap rake assembly comprising a beam disposed horizontally and spaced above the ground for movement over the ground in a direction of operation, a plurality of tines operatively connected to said beam and depending therebelow for engaging sand on the ground, a plurality of ground combing plates connected with said beam and being disposed rearwardly of said tines relative to said direction of operation for engaging that sand engaged by said tines and after said tines engage that sand during operation, flexible straps of fabric material interconnected relative to said beam and said combing plates for connecting said combing plates relative to said beam and being arranged to drag said combing plates over the sand during operation, said combing plates having a surface facing downwardly toward that sand engaged by said combing plates during operation, and anti-flip bars of non-flexible rigid material interengaged between said beam and said combining plates and spaced above and extending over said combing plates and being arranged to be in interference with the movement of said combing plates in the event said combing plates endeavor to move away from their position of having said surface facing downwardly.

7. A sand trap rake assembly comprising a beam disposed horizontally and spaced above the ground for movement over the ground in a direction of operation, a plurality of tines operatively connected to said beam and depending therebelow for engaging sand on the ground, a plurality of ground combing plates connected with said beam and being disposed rearwardly of said tines relative to said direction of operation for engaging that sand engaged by said tines and after said tines engage that sand during operation, flexible straps of fabric material interconnected relative to said beam and said combing plates for connecting said combing plates relative to said beam and being arranged to drag said combing plates over the sand during operation, said combing plates are arranged in shingled relationship to thereby have overlapping portions in the vertical direction, and bumpers disposed between said combing plates in their overlapping positions to thereby prevent contact between said combing plates upon vertical movement of said combing plates relative to each other.

* * * * *